(12) United States Patent
Yang et al.

(10) Patent No.: US 11,271,652 B2
(45) Date of Patent: Mar. 8, 2022

(54) DISTRIBUTED INTERNET OF THINGS TERMINAL SYSTEM AND METHOD BASED ON OPTICAL FIBER BUS ROF

(71) Applicant: Chifeng Share Technology Co.,Ltd., Beijing (CN)

(72) Inventors: Wenyu Yang, Beijing (CZ); Yanming Yang, Beijing (CN); Xianyin Fan, Beijing (CN); Ying Jiang, Beijing (CN); Jiahui Cong, Beijing (CN); Zhiqiang Zhang, Beijing (CN); Yanli Yang, Beijing (CN); Yubing Zhan, Beijing (CN)

(73) Assignee: Chifeng ShareTechnology Co., Ltd.

( * ) Notice: Subject to any disclaimer, the term of this patent is extended or adjusted under 35 U.S.C. 154(b) by 0 days.

(21) Appl. No.: 16/317,735

(22) PCT Filed: Aug. 15, 2018

(86) PCT No.: PCT/CN2018/100584
§ 371 (c)(1),
(2) Date: Jan. 14, 2019

(87) PCT Pub. No.: WO2020/024332
PCT Pub. Date: Feb. 6, 2020

(65) Prior Publication Data
US 2021/0336698 A1    Oct. 28, 2021

(30) Foreign Application Priority Data
Aug. 1, 2018    (CN) .................... 201810861016.X

(51) Int. Cl.
*H04B 10/2575* (2013.01)
*H04W 4/029* (2018.01)
*H04L 12/40* (2006.01)

(52) U.S. Cl.
CPC ....... *H04B 10/25756* (2013.01); *H04L 12/40* (2013.01); *H04W 4/029* (2018.02)

(58) Field of Classification Search
CPC ............... H04B 10/2575–25759; H04W 4/029
See application file for complete search history.

(56) References Cited

U.S. PATENT DOCUMENTS

2011/0268446 A1* 11/2011 Cune ................ H04B 10/25753
                                                             398/79
2013/0089332 A1*  4/2013 Sauer ................ H04J 14/0278
                                                             398/72

(Continued)

*Primary Examiner* — Li Liu

(57) ABSTRACT

The invention discloses a distributed IoT terminal system and method based on a fiber optic bus RoF. The system comprises a core application part, a pre-channel part, a transmission channel part, an acquisition field part, an acquisition terminal part and a data source. The invention adopts the principle of light-borne ROF to adapt to pan-socialization, decentralization, verticalization, refinement, full traceability, full lifecycle management and governance, instant, real-time, online, interactive and distributed IoT applications. The integrated and integrated application of the invention improves social efficiency and saves social cost. It may be integrated and integrated the application into any application systems, and realized dynamic instant, real-time, online, centimeter level positioning application. It can infer the specific location of the positioning device. The invention combined ROF and RFID and combined high-speed bus and RFID technology to solve the "last mile problem" of RFID and physical offline applications.

7 Claims, 2 Drawing Sheets

(56) References Cited

U.S. PATENT DOCUMENTS

| | | | | |
|---|---|---|---|---|
| 2017/0019144 | A1* | 1/2017 | Malach | H04W 4/80 |
| 2018/0287833 | A1* | 10/2018 | Kennedy | H04L 25/26 |
| 2018/0352498 | A1* | 12/2018 | Reisslein | H04W 16/24 |
| 2019/0379455 | A1* | 12/2019 | Wang | H03M 3/458 |
| 2019/0379664 | A1* | 12/2019 | Suthar | H04L 63/0892 |

* cited by examiner

DISTRIBUTED INTERNET OF THINGS TERMINAL SYSTEM AND METHOD BASED ON OPTICAL FIBER BUS ROF

TECHNICAL FIELD

The present invention relates to the field of Internet of things (IoT), and in particular to a distributed IoT terminal system and method based on a fiber optic bus RoF.

BACKGROUND

The existing RFID read/write system has the following problems: the area covered by signal is limited by number of readers, transmission distance of copper strands and number of antenna deployments. The system deployment cost increases with more area covered by the signal and increased number of readers. It limits and constrains entity and online integration of existing applications. It limits and restricts further discrete application of labels and products. It limits and restricts identification of personnel, equipment, objects and products instant, real-time, online fine management and application in the procurement process, production process, circulation link, warehousing logistics, retail links, distribution links, any time and any place.

In the existing technology, most of the coordinate positions of fixed target are pre-identified, and pseudorange prediction and navigation simulation are performed according to the coordinates of the fixed target and the current user coordinates whether by aerial satellite positioning, ground station positioning or other positioning technologies. In the existing indoor positioning technology, RFID positioning technology may realize information of centimeter-level positioning accuracy in a few milliseconds within a short range, and transmission range is large due to the advantages of the electromagnetic field non-line of sight, and the volume of the logo is relatively small, and the cost is low. However, it does not have long-distance communication capability, and its anti-interference ability is poor, which is not easy to be integrated into other positioning systems.

The definitions of the professional terms that may appear in the present invention are given below:

An optical fiber is a fiber made of glass or plastic and can be used as a light-conducting tool. Optical fiber communication has large capacity, low transmission loss, large relay distance. The relay distance is up to 200 kilometers, is 20 to 50 times that of copper wire. The weight of Optical fiber is light, and the weight per unit volume is only 1/20 of copper, so it can save a lot of copper metal and reduce cost. It has significant economic benefits, strong confidentiality, high reliability, anti-electromagnetic interference, no stringing, noise and interference phenomena in electrical communication lines.

Radio Over Fiber (ROF) technology is a high-capacity wireless communication technology. ROF is wireless access technology that combining optical fiber communication and wireless communication. It may realize rapid transmission, exchanging, controlling, signal regeneration and other functions of the ROF technology by operating fiber as a communication base station, and establishing transmission parameters and lines with a central station, and the RF signal is transmitted by using the optical carrier.

Fiber Bragg Grating (FBG) is a spatially periodic grating formed in a fibre core. The essence of the function is to form a narrow band (transmission or reflection) filter or mirror in the fibre core. This feature can be used to manufacture many unique fiber optic devices.

Wavelength Division Multiplexing (WDM) is to combine two or more optical carrier signals (various information) of different wavelengths at a transmitting end through a multiplexer (also called a multiplexer), and coupling into the same fiber of an optical line for transmission. At a receiving end, a demultiplexer (also known as a demultiplexer or demultiplexer) separates optical carriers of various wavelengths and then further processed by light receiver to recover an original signal.

An optical phase modulator is an optical modulator that changes the phase of light according to certain regularity.

Fieldbus is an industrial data bus that has been rapidly developed in recent years. It mainly solves the digital communication between field devices such as intelligent instrumentation, controllers and actuators in industrial field, and these field control devices and advanced control information transfer problems between systems. Due to the outstanding advantages of fieldbus, such as simple, reliable, economical and practical, it has been highly valued by many standards bodies and computer manufacturers. It is an industrial data bus and is the underlying data communication network in the field of automation.

Controller Area Network (CAN) is an ISO international standardized serial communication protocol. German Bosch developed a CAN communication protocol for automobiles in 1986. Then, CAN has been standardized by ISO11898 and ISO11519, and is the standard protocol for automotive networks in Europe.

Internet of Things (IoT) is a network interconnection that extends and extends its client-side to any item and item for information exchange and communication based on the concept of the Internet. It can connect any items through the Internet of Things domain name, exchange information and communicate to realize intelligent identification, location, tracking, monitoring, and management through information sensing equipment such as RF identification (RFID), infrared sensor, global positioning system, laser scanner, etc., according to the agreed agreement.

RF identification (RFID) is a non-contact automatic identification technology. Its basic principle is to use the transmission characteristics of RF signals and spatial coupling (inductance or electromagnetic coupling) or radar reflection to realize the identification. The RFID reader/writer wirelessly communicates with the RFID electronic tag through the antenna, so that the tag identification code and the memory data can be read or written. A typical RFID reader includes an RFID radio module (transmitter and receiver), a control unit, and a reader antenna.

The electronic tags are also known as RF tags, transponders, and data carrier. Reader is also known as readout, scanner, read head, communicator, and reader (depending on whether the electronic tag can wirelessly overwrite data). The space (contactless) coupling of the RF signal is realized between the electronic tag and the reader through coupling components. Energy transfer and data exchange are realized according to the timing relationship in the coupling channel.

An antenna is a device that transmits/receives an RF carrier signal. It is a transducer that transforms a guided wave propagating on a transmission line into an electromagnetic wave propagating in an unbounded medium (usually free space), or vice versa. It is a component used in a radio device to transmit or receive electromagnetic waves. Engineering systems such as radiocommunication, broadcasting, television, radar, navigation, electronic countermeasures, remote sensing, radio astronomy, etc., which use electromagnetic waves to transmit information all rely on antennas to work.

A phased array antenna refers to an antenna that changes the shape of a pattern by controlling the feed phase of a radiating element in the array antenna. Controlling the phase can change the orientation of the maximum value of the antenna pattern for beam scanning purposes. In special cases, it is also possible to control the sidelobe level, the minimum position, and the shape of the entire pattern, such as obtaining a cutter square pattern and adaptively controlling the pattern. When the antenna is rotated by mechanical means, the inertia is large and the speed is slow and the phased array antenna overcomes this shortcoming, and the scanning speed of the beam is high. Its feed phase is generally controlled by an electronic computer, and the phase change speed is fast (on the order of milliseconds), that is, the maximum value of the antenna pattern or other parameters change rapidly.

Indoor positioning refers to the positioning in the indoor environment. It mainly uses wireless communication, base station positioning, inertial navigation and other technologies to form an indoor positioning system to realize the position monitoring of people and objects in the indoor space. Addition to the cellular positioning technology of communication networks, common indoor wireless positioning technologies include Wi-Fi, Bluetooth, infrared, ultra-wideband, RFID, ZigBee and ultrasound.

SUMMARY

In view of the above technical problems in the related art, the present invention provides a distributed IoT terminal system and method based on a fiber optic bus RoF, which can overcome the above-mentioned deficiencies of the prior art.

To achieve the above technical purpose, the technical solution of the present invention is implemented as follows:

A distributed IoT terminal system based on fiber optic bus RoF, comprising a core application part, a preposed channel part, a transmission channel part, an acquisition field part, an acquisition terminal part and a data source.

The core application part deploys an application service function module comprising a service combination of a service station, a monitoring station, a master control station, an information station and an user terminal.

The preposed channel part is used to deploy a processor function module including a processor combination of a preposed total control module, a bus control module, a RF signal processing module, NB-IoT, LoRa, RPMA, WiFi, BLE, RF, 2G/3G/4G/5G and network connection module wherein the RF signal processing module is configured to read and write a RF signal and perform a function of inputting and outputting the RF signal the bus control module is configured to convert a received and sent information message into a standardized bus protocol frame conforming to a bus protocol that exchanged information on a high-speed bus or exchanged information on a fiber-optic bus through a transceiver in a bus control module via a transceiver in a bus control module; NB-IoT, LoRa, RPMA, WiFi, BLE, RF, 2G/3G/4G/5G and the network connection module are configured for wireless and wired networking interaction with application services.

The transmission channel part comprises a network transmission channel composed of an optical coupler, a connector, a high speed bus and a fiber optic bus.

The acquisition field part comprises a bus controller combination of a bus control module, and the bus control module is configured to convert the sent and received information message into a bus protocol frame conforming to the bus protocol, and exchanging information on a high-speed bus or exchanging information on a fiber-optic bus through an optical modulator, a demodulator and a transceiver in the bus control module.

The acquisition terminal part is configured to deploy an exciter receiver function module, including a passive antenna device, a passive phased array antenna device, an active phased array antenna device, a sensor and an exciter receiver device.

The data source part includes an electronic tag, an active electronic tag, a wireless controller, or a person, a device, an item, or a product identified by an electronic tag.

Further, the service station is composed of application service workstations distributed in a bus node. Each service station can be equipped with more than one service node, and each service node can be equipped with multiple decentralized and functional service applications.

Further, the monitoring station has a security operation service function for monitoring a bus, a bus node, a terminal node, and a service node, and ensures that any node device on the bus terminal operates in any location, global network, and all weather operation. it is used for tracking and routine maintenance and used to monitor health, integrity and signal integrity, integrity and stability of running node conditions, to maintain the channel layout of buses, bus nodes, terminal nodes and service nodes.

Further, the master control station has a main control service function which processes data message information of the control service and performs data calculation on the line protocol message. It is used for calculating the bus time, the time difference, and the bus message, and calculating other parameters that is critical to determining the location, speed, and time of users, equipment, and products. The master station transfers the control information to the information station.

Further, the information station has an information service function which stores control information processed by the main control station. The information station may provide the main control service information to the node device of the service workstation. The information station send information about perceived, identified, located and interacted personnel, equipment, and object products through an user receiving device and a terminal node device.

Further, the user terminal is composed of a user receiving device terminal node device and an identification device. The user terminal receives data sent by the application service, captures and tracks the identification device, and obtains navigation, positioning information and pseudorange observation. The location, speed and time parameters of the user, device and object products are finally determined by solving the user location Further, the front master control module is responsible for controlling the RF signal processing module to perform RF signal processing, and performing RF protocol message format combination, performing protocol interaction with the bus control module to perform bus control protocol message format combination, and performing network interaction with NB-IoT, LoRa, RPMA, WiFi, BLE, RF, 2G/3G/4G/5G and network connection module. It is responsible for ROF optical fiber or optical fiber sensor or optical environment parameter detection sensor, video communication fiber transceiver processing Interactions, or exchange information on the high-speed bus through transceivers in the bus control module, or exchange information on the fiber-optic bus through the optical modulators, demodulators, and transceivers in the bus control module. Further, the passive antenna device includes an optoelectronic/electrical to optical conversion module, a digital analog/analog to digital converter, a band pass filter, a power amplifier, a gain amplifier, a low noise amplifier, a circulator, a delay and a passive antenna.

Further, the active phased array antenna device includes a RF processing module, a high stability signal source, a quadrature phase detector, a receiver, a transmitter and an active phased antenna.

Further, the bus controller combination includes a transceiver in the bus control module, exchanging information on the high speed bus, or an optoelectronic/electrical optical conversion module, wherein the electrical signal is converted into an optical signal and propagated in the optical fiber, and then the optical signal is used by the photoelectric converter for converting to electrical signals for transmission to the antenna to receive and transmit information data;

The invention also provides a method for deploying a acquisition terminal of a distributed IoT terminal system based on a fiber optic bus RoF, comprising the following steps:

The RF signal is directly modulated onto the optical signal and transmitted to the antenna of the acquisition terminal through the optical fiber network. The antenna collects the data source signal and modulates the collected RF signal onto the optical fiber, and transmit it to the pre-processor through the optical fiber network. The front master control module performs RF signal processing and interaction through the RF signal processing module.

The invention also provides an other method for deploying a acquisition terminal of a distributed IoT terminal system based on a fiber optic bus RoF, comprising the following steps:

Digitally convert the RF signal, perform bus protocol combination conversion through the bus control module, exchange information on the high-speed bus through the transceiver in the bus control module, transmit to the acquisition field bus control module through the high-speed bus, or modulate the bus protocol frame data onto the optical fiber bus and transmit to the acquisition field bus control module through the optical fiber. The bus control module sends the signal to the acquisition terminal antenna. The antenna collects the data source signal. The collected RF signal is sent to the bus control module for the bus protocol conversion. The transceiver in the bus control module exchanges information on the high-speed bus and transmits it to the pre-processor bus control module through the high-speed bus, or the bus control module modulates the bus protocol frame data onto the optical fiber, and transmit it to the pre-processor through optical fiber network. The front master control module performs bus data reception processing by controlling the bus control module, and the RF protocol is transmitted to the RF signal processing module for RF signal processing.

The invention also provides an other method for deploying a acquisition terminal of a distributed IoT terminal system based on a fiber optic bus RoF, which is a method for a RF fiber ROF phased array RFID system, comprising the following steps:

The RF signal processing module is controlled by the preposed total control module for signal processing, and the bus protocol is combined and converted by the bus control module, and information is exchanged on the high-speed bus through the transceiver in the bus control module and transmits it to acquisition field bus control module through the high-speed bus. Or the bus control module modulates the bus protocol frame data onto the optical fiber bus and transmits data to the acquisition field bus control module through the optical fiber. The collected RF signal is sent to the bus control module for bus protocol conversion, the transceiver in the bus control module exchanges information on the high-speed bus and transmit to the pre-processor bus control module through the high-speed bus, or the bus control module connects the bus the protocol. The preposed master control module performs bus data reception processing by controlling the bus control module, and sends RF protocol to the RF signal processing module for RF signal processing.

The invention also provides a fourth method for deploying a acquisition terminal of a distributed IoT terminal system based on a fiber optic bus RoF, which is a method for a RF fiber ROF active phased array RFID system, comprising the following steps:

Through collecting the terminal field front high-stability signal source, the phased-array antenna signal acquisition processing and interacting with the pre-processor are performed initiatively, immediately and in real time. The preposed master control module controls the bus control module to send control commands. The signal is performed bus protocol combination conversion through the bus control module. Information is exchanged on the high-speed bus through a transceiver in the bus control module, or transmitted to the acquisition field bus control module through the high-speed bus, or the bus protocol frame data is modulated onto the optical bus, and transmitted to the optical bus through the optical fiber. The field bus control module is collected, and the bus control module sends a signal to the RF control processing. The RF control processing module controls the high stability signal source to generate a high stable signal, and transmit the data to the phased array antenna. The source signal is collected, and the collected signal is sent to the receiver, and the receiver sends the signal to the quadrature phase detector. After the quadrature phase detector processes the data, the data is processed by the RF control processing module and sent to the bus control module, and the bus control module performs the bus protocol conversion. The transceiver in the module exchanges information on the high-speed bus, transmit it to the pre-processor bus control module through the High-speed bus, or modulates the bus protocol frame data onto the optical fiber, and transmit it to the pre-processor through the optical network. The front master control module performs bus data reception processing by controlling the bus control module.

The invention also provides a fifth method for deploying a acquisition terminal of a distributed IoT terminal system based on a fiber optic bus RoF, which is a method for a fiber sensor or a sensor communication fiber system, comprising the following steps:

The preposed total control module controls the RF signal processing module, processes the optical fiber sensor or the optical environment parameter detecting sensor of the acquisition terminal, the sensing signal collected by the video communication optical fiber, or the preposed total control module controls the bus control module to send a control command through the bus. The control module converts the signal into a bus protocol, exchanges information on the high-speed bus through the transceiver in the bus control module, transmit the data to the acquisition field bus control module through the high-speed bus, or modulates the bus protocol frame data onto the optical fiber bus. The optical fiber is transmitted to the acquisition field bus control module, and the bus control module sends the signal to the acquisition terminal, and the collected environmental parameter Sensor signal and the video communication signal are sent to the bus control module, the bus control module performs transformation information on the high-speed bus, transmitting it to the pre-processor bus control module through the high-speed bus, or modulating the bus protocol frame data onto the optical fiber, transmitting it to the pre-processor through the optical fiber network, and controlling the front-end total control module bus system bus data reception processing module.

The beneficial effects of the present invention are as follows:

1. The invention adopts the principle of RFR to directly modulate signal of the existing RFID RF reader antenna to the optical signal, and combines the existing bus protocol technology principle to connect the signal analog-to-digital conversion of the existing RFID RF reader antenna and bus protocol conversion to the high-speed bus, and further the RFID RF reader antenna is combined with the passive phased array and the active phased array antenna technology, and the optical sensor combined with the environmental parameter detection sensor data signal integration and integration applications to adapt to pan-socialization, decentralization, verticalization, refinement, full traceability, full life-cycle management and governance, instant, real-time, online, interactive, distributed IoT applications.

2. The invention combines ROF technology, bus control technology, radar antenna phased array technology, Internet of Things technology with RFID technology. It saves the number of RFID readers, expands the number of antennas and extends the transmission distance, and expands the present internet and IoT application entities and online deep integration have expanded the extensive application of IoT labels and objects and product combinations, and expanded the identification of personnel, equipment, objects and products in the procurement process, in the production process, circulation, warehousing, retail, distribution, and pan-industry, pan-social, real-time, real-time, online fine management and governance at any time and any place, further integrated and integrated applications to improve social efficiency and save social costs.

3. The invention combines ROF technology, bus control technology, radar antenna phased array technology, Internet of Things technology with RFID technology and is applied in indoor positioning technology to realize low-cost electronic fence control of RFID signals in designated areas. The current wireless mobile network can integrate and integrate applications into the internet and IoT application systems to realize dynamic instant, real-time online centimeter-level positioning applications.

4. The present invention uses the time of arrival (TOA) to measure the distance between the service device node of the known location and the user receiving device, and then integrates the information data of the plurality of terminal node devices and tags, and may determine a positioning device and the specific location of the label, any time, anywhere, in any way, the dream of getting the internet of everything and all kinds of multimedia information becomes a reality.

5. The invention combines ROF with RFID technologies, and combines high-speed bus with RFID technology to solve the "last mile problem" of RFID and physical offline applications. ROF technology is considered as an option for future fiber access due to its flexibility, broad band utilization and high cost performance, low loss and large capacity. ROF technology is the most promising solution to solve the "last mile problem" in the future.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

The technical solutions in the embodiments of the present invention are clearly and in the following with reference to the accompanying drawings in the embodiments of the present invention. It is obviously that the accompanying embodiments are only a part of the embodiments of the present invention and not all embodiments.

Figure 1:
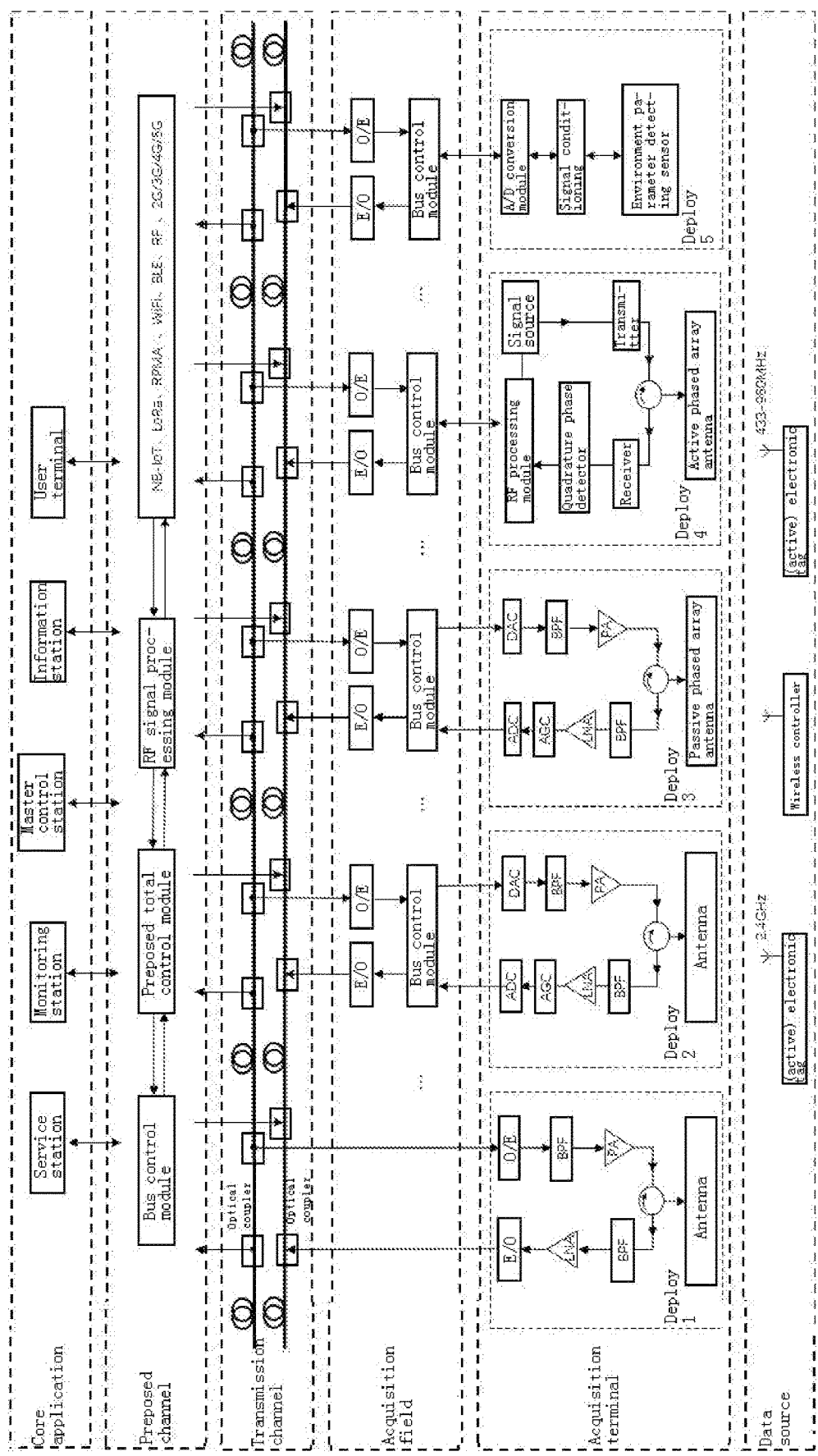
FIG. 1 is a schematic diagram of a distributed IoT terminal system based on a fiber optic bus RoF according to an embodiment of the present invention.
Figure 2:
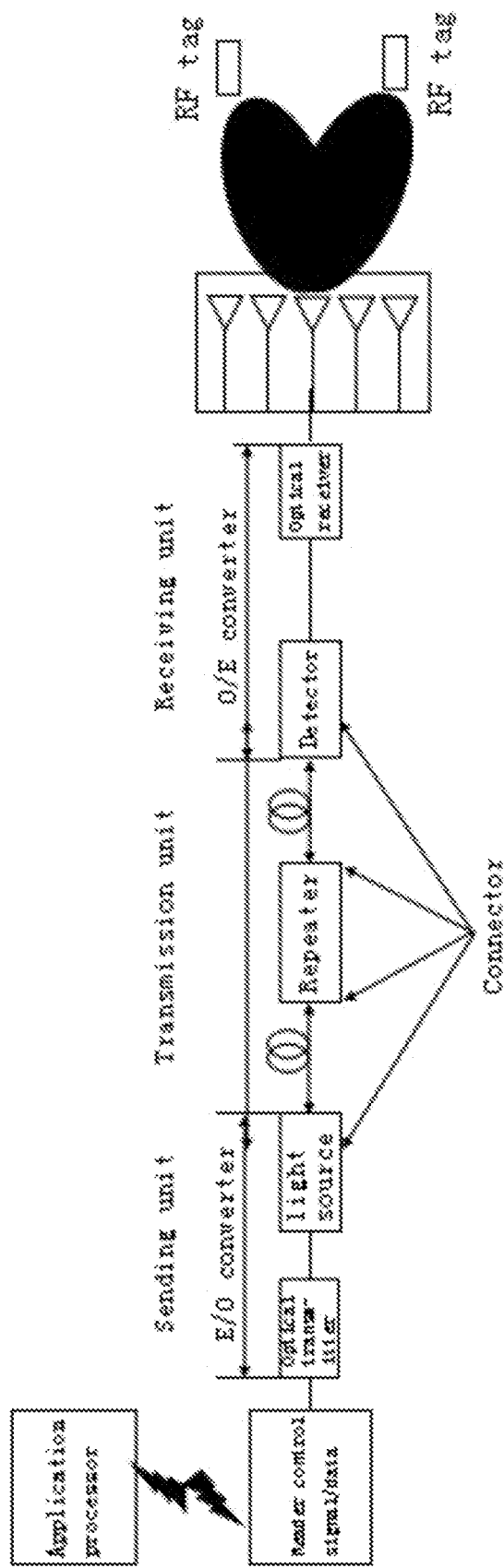
FIG. 2 is a system diagram of the ROF phased array RFID of the present invention.

Referring to FIG. 1-2, a distributed IoT terminal system based on a fiber optic bus RoF according to an embodiment of the invention includes a core application part, a preposed channel part, a transmission channel part, and an acquisition field part, acquisition terminal part and data source.

The core application part deploys an application service function module including a service combination of a service station, a monitoring station, a master control station, an information station and an user terminal.

The preposed channel part is used to deploy a processor function module including a preposed total control module, a bus control module, a RF signal processing module, a processor combination of NB-IoT, LoRa, RPMA, WiFi, BLE, RF, 2G/3G/4G/5G and network connection module. Wherein the RF signal processing module has a function of reading and writing the RF signal to perform input and output of the RF signal. The bus control module is configured to convert the sent and received Information message into a bus protocol frame conforming to the bus protocol specification. The transceivers exchange information on the high-speed bus or exchange information on the fiber-optic bus through the optical modulators, demodulators, and transceivers in the bus control module. NB-IoT, LoRa, RPMA, WiFi, BLE, RF 2G/3G/4G/5G and network connection module are used for wireless and wired networking interaction with application services combination.

The transmission channel part includes a network transmission channel composed of an optical coupler, a connector, a high speed bus, and a fiber optic bus.

The acquisition field part comprises a combination of a bus controller module and a bus controller. The bus control module is configured to convert the sent and received information message into a bus protocol frame conforming to the bus protocol specification, and exchange information on a high-speed bus through the transceiver in the bus control module, or exchange information on a fiber-optic bus through optical modulators, demodulators, and transceivers in the bus control module.

The acquisition terminal part is configured to deploy an exciter receiver function module including a passive antenna device, a passive phased array antenna device, an active phased array antenna device, a sensor and an exciter receiver device.

The data source part includes an electronic tag, an active electronic tag, a wireless controller, or a person, device, item, or product identified by the electronic tag.

Further, the service station is composed of application service workstations distributed in a bus node. Each service station can be equipped with more than one service node, and each service node can be configured with multiple decentralized and functional service applications.

Further, the monitoring station is a security operation service function for monitoring a bus, a bus node, a terminal node and a service node, and ensures that any node device on the bus terminal operates in any location, global network all-weather. It is used for tracking and routine maintenance to monitor the health, integrity and signal integrity, integrity and stability of running node conditions, to maintain the channel layout of buses, bus nodes, terminal nodes and service nodes.

Further, the master control station has a main control service function, processes data message information of the control service, and performs data calculation on the line protocol message, and is used for calculating the bus time, the time difference and the bus message, and calculating other parameter that is critical to determining the location, speed, and time of users, equipment and item products. The master station feeds control information into the information station.

Further, the information station has an information service function, and stores the control information processed by the main control station, and the information station can provide the main control service information to the node device of the service workstation, and the information station passes through the user receiving device and the terminal node device.

The user sends information about the personnel, equipment, and object products that are perceived, identified, located, and interacted.

Further, the user terminal is composed of a user receiving device terminal device and an identification device. The user terminal receives data sent by the application service, and captures and tracks the identification device, and obtains navigation, positioning information and pseudorange observation. The user location resolves and finally determines the location, speed, and time parameters of the user, device, and object product.

Further, the preposed total control module is responsible for controlling the RF signal processing module to perform RF signal processing, performing RF protocol message format combination and performing protocol interaction with the bus control module to perform bus control protocol message format combination, perform network interaction with NB-IoT, LoRa, RPMA, WiFi, BLE, RF, 2G/3G/4G/5G, network connection module. It is responsible for optical RFRF or optical fiber sensor or optical environment parameter detection sensor, video communication fiber transceiver processing interactions, or exchange information on the high-speed bus through transceivers in the bus control module, or exchange information on the fiber-optic bus through the optical modulators, demodulators, and transceivers in the bus control module.

Further, the passive antenna device includes an optoelectronic/electrical to optical conversion module, a digital analog/analog to digital converter, a band pass filter, a power amplifier, a gain amplifier, a low noise amplifier, a circulator, a delay and a passive antenna.

Further, the active phased array antenna device comprises a RF processing module, a high stability signal source, a quadrature phase detector, a receiver, a transmitter and an active phased antenna.

Further, the bus controller combination includes a transceiver in the bus control module exchanging information on the high speed bus, or an optoelectronic/electrical optical conversion module wherein the electrical signal is converted into an optical signal and propagated in the optical fiber, and then the optical signal is used by the photoelectric converter converting to electrical signals for transmission to the antenna to receive and transmit information data.

The invention also provides a method for deploying a acquisition terminal of a distributed IoT terminal system based on a fiber optic bus RoF, comprising the following steps:

The RF signal is directly modulated onto the optical signal and transmitted to the antenna of the acquisition terminal through the optical fiber network. The antenna collects the data source signal and modulates the collected RF signal onto the optical fiber, and transmit it to the pre-processor through the optical fiber network. The front master control module performs RF signal processing and interaction through the RF signal processing module.

The invention also provides an other method for deploying a acquisition terminal of a distributed IoT terminal system based on a fiber optic bus RoF, comprising the following steps:

Digitally convert the RF signal, perform bus protocol combination conversion through the bus control module, exchange information on the high-speed bus through the transceiver in the bus control module, transmit to the acquisition field bus control module through the high-speed bus, or modulate the bus protocol frame data onto the optical fiber bus and transmit to the acquisition field bus control module through the optical fiber. The bus control module sends the signal to the acquisition terminal antenna. The antenna collects the data source signal. The collected RF signal is sent to the bus control module for the bus protocol conversion. The transceiver in the bus control module exchanges information on the high-speed bus and transmits it to the pre-processor bus control module through the high-speed bus, or the bus control module modulates the bus protocol frame data onto the optical fiber, and transmit it to the pre-processor through optical fiber network. The front master control module performs bus data reception processing by controlling the bus control module, and the RF protocol is transmitted to the RF signal processing module for RF signal processing.

The invention also provides an other method for deploying a acquisition terminal of a distributed IoT terminal system based on a fiber optic bus RoF, which is a method for a RF fiber ROF phased array RFID system, comprising the following steps:

The RF signal processing module is controlled by the preposed total control module for signal processing, and the bus protocol is combined and converted by the bus control module, and information is exchanged on the high-speed bus through the transceiver in the bus control module and transmits it to acquisition field bus control module through the high-speed bus. Or the bus control module modulates the bus protocol frame data onto the optical fiber bus and transmits data to the acquisition field bus control module through the optical fiber. The collected RF signal is sent to the bus control module for bus protocol conversion, the transceiver in the bus control module exchanges information on the high-speed bus and transmit to the pre-processor bus control module through the high-speed bus, or the bus control module connects the bus the protocol. The preposed master control module performs bus data reception processing by controlling the bus control module, and sends RF protocol to the RF signal processing module for RF signal processing.

The invention also provides a fourth method for deploying a acquisition terminal of a distributed IoT terminal system based on a fiber optic bus RoF, which is a method for a RF fiber ROF active phased array RFID system, comprising the following steps:

Through collecting the terminal field front high-stability signal source, the phased-array antenna signal acquisition processing and interacting with the pre-processor are performed initiatively, immediately and in real time. The preposed master control module controls the bus control module to send control commands. The signal is performed bus protocol combination conversion through the bus control module. Information is exchanged on the high-speed bus through a transceiver in the bus control module, or transmitted to the acquisition field bus control module through the high-speed bus, or the bus protocol frame data is modulated onto the optical bus, and transmitted to the optical bus through the optical fiber. The field bus control module is collected, and the bus control module sends a signal to the RF control processing. The RF control processing module controls the high stability signal source to generate a high stable signal, and transmit the data to the phased array antenna. The source signal is collected, and the collected signal is sent to the receiver, and the receiver sends the signal to the quadrature phase detector. After the quadrature phase detector processes the data, the data is processed by the RF control processing module and sent to the bus control module, and the bus control module performs the bus protocol conversion. The transceiver in the module exchanges information on the high-speed bus, transmit it to the pre-processor bus control module through the High-speed bus, or modulates the bus protocol frame data onto the optical fiber, and transmit it to the pre-processor through the optical network. The front master control module performs bus data reception processing by controlling the bus control module.

The invention also provides a fifth method for deploying a acquisition terminal of a distributed IoT terminal system based on a fiber optic bus RoF, which is a method for a fiber sensor or a sensor communication fiber system, comprising the following steps:

The preposed total control module controls the RF signal processing module, processes the optical fiber sensor or the optical environment parameter detecting sensor of the acquisition terminal, the sensing signal collected by the video communication optical fiber, or the preposed total control module controls the bus control module to send a control command through the bus. The control module converts the signal into a bus protocol, exchanges information on the high-speed bus through the transceiver in the bus control module, transmit the data to the acquisition field bus control module through the high-speed bus, or modulates the bus protocol frame data onto the optical fiber bus. The optical fiber is transmitted to the acquisition field bus control module, and the bus control module sends the signal to the acquisition terminal, and the collected environmental parameter Sensor signal and the video communication signal are sent to the bus control module, the bus control module performs transformation information on the high-speed bus, transmitting it to the pre-processor bus control module through the high-speed bus, or modulating the bus protocol frame data onto the optical fiber, transmitting it to the pre-processor through the optical fiber network, and controlling the front-end total control module bus system bus data reception processing module.

In order to facilitate the understanding of the above technical solutions of the present invention, the above technical solutions of the present invention will be described in detail.

A distributed IoT terminal system based on fiber optic bus RoF is shown in FIG. 1, comprising core application part, pre-channel part, transmission channel part, acquisition field part, acquisition terminal part and data source. The core application part comprises application service combinations of a service station, a monitoring station, a main control station, an information station, an user terminal. The core application part deploys the application service function module. The service station is composed of the application service workstation and is distributed in the bus node. Each service station may be equipped with more than one service node, each service node can be configured with multiple decentralized and functional service applications. The monitor station is security operation service function of the monitoring bus, the bus node and the terminal node which ensures the function of any node device on the bus terminal in any place, global network and all-weather operation. It is used for tracking and routine maintenance to monitor the health, integrity and signal integrity, integrity and stability of running node conditions, to maintain the channel layout of buses, bus nodes, terminal nodes and service nodes, regular and safe service and abnormal warning. The main control station has the main control service function, processes the data message information of the control service, and performs data calculation on the line protocol message, which is used to calculate the bus time, time difference and bus message, calculating other parameters that are critical to determining the location, speed, and time of the user, equipment, and item products. The master station feeds control information into the information station; the information station has an information service function that stores control information processed by the master station The information station can provide the master control service information to the node device of the service workstation, and the information station sends the user, the device, the object product information that is perceived, identified, located and interacted to the user through the user receiving device and the terminal node device. The user terminal comprising an user receiving device terminal node device and an identification device receives the data sent by the application service and performs acquisition and tracking of the identification device, and obtains navigation, positioning information and pseudorange measurements. A location, velocity and time parameters of the user, devices and an object product is determined finally through resolving the position of the user.

The preposed channel part comprises a preposed total control module, a bus control module, a RF signal processing module, NB-IoT, LoRa, RPMA, WiFi, BLE, RF, 2G/3G/4G/5G, network connection module. The preposed channel part deploys the processor function module. Wherein the preposed total control module is responsible for controlling the RF signal processing module to perform RF signal processing and performing RF protocol message format combination. The bus control module performs protocol interaction to perform bus control protocol message, performs network interaction with NB-IoT, LoRa, RPMA, WiFi, BLE, RF, 2G/3G/4G/5G and the network connection module. It is responsible for optical RF or optical fiber sensor or optical environment parameters detection sensor and the video communication fiber perform transceiving and processing interaction, or exchange information on the optical fiber bus through the transceiver in the bus control module. The RF signal processing module is a function of reading and writing RF signals and inputting and outputting RF signals. The bus control module is used to convert the received and sent information message into a bus protocol frame conforming to the bus protocol specification. The transceivers exchange information on the high-speed bus or exchange information on the fiber-optic bus through the optical modulators, demodulators, and transceivers in the bus control module. The NB-IoT, LoRa, RPMA, WiFi, BLE, RF 2G/3G/4G/5G, network connection module and application service combination perform wireless and wired networking interaction.

The transmission channel section comprises an optocoupler, a connector, a high speed bus and a fiber optic bus network.

The acquisition field part comprising a bus control module, a photoelectric controller/electrical-optical conversion module and the like. Wherein the photoelectric/electrical-optical conversion module of the bus controller converts the electrical signal into an optical signal and propagates in the optical fiber, and then the photoelectric converter converts the optical signal into an electrical signal and transmits to the antenna for receiving and transmitting information data.

The acquisition terminal part comprise passive antenna devices such as a photoelectric/electro-optical conversion module, a digital analog/analog to digital converter, a band pass filter, a power amplifier, a gain amplifier, a low noise amplifier, a circulator, a delay, a passive antenna and the like, and active phased array antenna devices such as RF processing modules, highly stable signal sources, quadrature phase detectors, receivers, transmitters, active phased antennas and the like, and pressure, shock, acceleration, positioning information, status information, voltage temperature, the sense of the ground, the sense of light, the sense of sound, video processing and other environmental parameter detection sensors and other exciter receiver device function combination. The acquisition terminal part deployment exciter receiver function module specifically includes the following five deployments:

The deployment one is: the RF signal is directly modulated to the optical signal which is transmitted to the antenna of the acquisition terminal through the optical fiber network. The antenna collects the data source signal. The collected RF signal is modulated onto the optical fiber, and is transmitted to the pre-processing through the optical fiber network. The front-end total control module performs RF signal processing and interaction through the RF signal processing module.

The second deployment: The RF signal is digitally converted. The bus protocol combination conversion is performed through the bus control module. Information is exchanged on the high-speed bus through the transceiver in the bus control module and is transmitted to the acquisition field bus control module through the high-speed bus. Or the bus protocol frame data is modulated onto the optical fiber bus, and is transmitted to the acquisition field bus control module through the optical fiber. The bus control module sends the signal to the acquisition terminal antenna, and the antenna collects the data source signal, and sends the collected RF signal to the bus control. The module performs bus protocol conversion. The transceiver in the bus control module exchanges information on the high-speed bus and transmits it to the pre-processor bus control module through the high-speed bus, or the bus control module modulates the bus protocol frame data onto the optical fiber and transmits it to the pre-processing through the optical network. The preposed master control module performs bus data reception processing by controlling the bus control module, and transmits the RF protocol to the RF signal processing module for RF signal processing.

The deployment of the third is a deployment method of a ROF phased array RFID system, shown as FIG. 2. Signal processing is performed through the preposed total control module control RF signal processing module. The signal bus protocol combination conversion is performed through the bus control module. Exchanging information on the high-speed bus through a transceiver in the bus control module, and transmits it to the acquisition field bus control module through the high-speed bus, or modulates the bus protocol frame data onto the optical fiber bus, and transmits it to the acquisition field bus control module through the optical fiber. The signal is sent to the phased array antenna of the acquisition terminal through the bus control module. The phased array antenna collects the data source signal, and the collected RF signal is sent to the bus control module for bus protocol conversion, and the transceiver in the bus control module exchanges information on the high speed bus. It is transmitted to the pre-processor bus control module through the high-speed bus, or the bus control module modulates the bus protocol frame data onto the optical fiber, and transmits it to the pre-processor through the optical fiber network. The preposed master control module performs data reception processing through the bus control module. The RF Protocol is transmitted to a RF signal processing module for processing the RF signal.

Deployment 4 is deployment method of a ROF active phased array RFID system. The principle is referred to the ROF phased array RFID system diagram. By collecting the front field high stability signal source, the phased array antenna signal acquisition is processed in real time and interacting with the pre-processor. The preposed master control module controls the bus control module to send control commands which converts the signals to the bus protocol through the bus control module and exchanges information on the high-speed bus through the transceivers in the bus control module. It is transmitted to the acquisition field bus control module, or the bus protocol frame data is modulated onto the optical fiber bus and transmitted to the acquisition field bus control module through the optical fiber. The bus control module sends the signal to the acquisition terminal RF control processing module, and the RF control processing module controls the high stable signal source to generate a high stable signal and transmits it to the phased array antenna through the transmitter. The phased array antenna collects the data source signal and sends the collected signal to the receiver which sends the signal to the quadrature phase detector. After the quadrature phase detector is processed, through the RF processing module processes the data and sends it to the bus control module. The bus control module performs bus protocol conversion. The transceiver in the bus control module exchanges information on the high speed bus and transmits it to the preprocessor bus control module through the high speed bus, or the bus protocol frame data is modulated onto the optical fiber and transmitted to the pre-processor through the optical fiber network. The preposed master control module performs bus data reception processing by controlling the bus control module.

The deployment 5 is a system deployment method of a fiber sensor or a sensor communication fiber. The preposed total control module controls the RF signal processing module and processes a sensing signal collected by a fiber sensor, an optical environment parameter detection sensor, or a video communication fiber of the acquisition terminal. Or the preposed total control module controls the bus control module to send a control command which converts the signal into a bus protocol through the bus control module, exchanges information on the high speed bus through the transceiver in the bus control module, and transmits the information to the acquisition field bus through the high speed bus. The control module or the bus protocol frame data is modulated onto the optical fiber bus and transmitted to the acquisition field bus control module through the optical fiber. The bus control module sends the signal to the acquisition terminal and sends the collected environmental parameter sensor signal and the video communication signal to the bus control. The bus control module performs bus protocol conversion. The transceiver in the bus control module exchanges information on the high speed bus and transmits it to the preprocessor bus control module through the high speed bus, or modulates the bus protocol frame data onto the optical fiber and transmitted it through the optical fiber network to a pre-processor. The preposed total control module performs bus data reception process by controlling the bus control module.

The data source section comprises an electronic tag, an active electronic tag, a wireless controller, or a person, a device, an item, or a product identified by an electronic tag.

The above example is only the preferred embodiment of the present invention, and is not intended to limit the present invention. Any modifications, equivalent substitutions, improvements, etc., which are included in the spirit and scope of the present invention, should be included in the present invention within the scope of protection.

The invention claimed is:
1. A distributed IoT terminal system based on a fiber optic bus RoF, comprising:
 a core application part for deploying an application service function module including an application service combination of a service station, a monitoring station, a master control station, an information station and an user terminal;
 wherein the service station comprises application service workstations distributed in a bus node, and each service station may equipped with more than one service node, each service node may be equipped with multiple decentralized, functional service applications;
 wherein the monitoring station has a security operation function of monitoring a bus, a bus node, a terminal node and a service node which ensures any node device on a bus terminal can be used in any location, global network and all-weather operation for tracking and routine maintenance, and used to monitor running status, health status and signal integrity, integrity and stability, used to maintain the channel layout of buses, bus nodes, terminal nodes and service nodes, compliance with legitimate security and normal services and abnormal warnings;
 wherein the master control station has a main control service function which processes data message information of a control service and performs data calculation for a current line protocol message that is used to calculate the bus time, time difference and bus message, and calculate other parameters important for determining a position, a speed and time of a user, device and object product, the master control station will process the control information fed into the information station;
 wherein the information station has an information service function which stores a control information processed by the master control station, and the information station may provide a master service information to a node device of the service workstation, and the information station sends an information of the user, the device, and the object product perceived, identified, located and interacted to the user through an user receiving device and a terminal node device;
 wherein the user terminal comprises an user receiving device terminal node device and an identification device receiving a data sent by an application service, and capturing and tracking the identification device, and obtaining a navigation, positioning information and a pseudo-range observation which solved through a user location to determine a velocity and time parameter of the user, the device and the object product; and
 a preposed channel part for deploying a processor function module including a processor combination of a preposed total control module, a bus control module, a RF signal processing module, NB-IoT, LoRa, RPMA, WiFi, BLE, RF, 2G/3G/4G/5G and a network connection module; wherein the preposed total control module controls the RF signal processing module to read and write a RF signal and perform a function of inputting and outputting the RF signal; the bus control module is configured to convert a received and sent information message into a standardized bus protocol frame conforming to a bus protocol that exchanged information on a high-speed bus or exchanged information on a fiber-optic bus through a transceiver in a bus control module; NB-IoT, LoRa, RPMA, WiFi, BLE, RF, 2G/3G/4G/5G and the network connection module are configured for wireless and wired networking interaction with the application service combination, and responsible for interacting with optical RF or optical fiber sensor or optical environment parameter detection sensor, video communication fiber;
 a transmission channel part comprises a network transmission channel composed of an optical coupler, a connector, a high speed bus and a fiber optic bus;
 an acquisition field part comprises a bus controller combination of a bus control module, the bus control module is configured to convert sent and received information message into a bus protocol frame conforming to the bus protocol and exchange information on a high-speed bus or exchange information on a fiber-optic bus through optical modulators, demodulators and transceivers in the bus control module;
 the bus controller combination comprises a transceiver in the bus control module which exchanging information on the high speed bus, or a photoelectric/electrical to optical conversion module where an electrical signal is converted into an optical signal and propagated in an optical fiber, and then the optical signal is converted into an electrical signal by a photoelectric converter and transmitted to the antenna to receive and transmit the information data;
 an acquisition terminal part configured to deploy an exciter receiver function module including a passive antenna device, a passive phased array antenna device, an active phased array antenna device, a sensor and an exciter receiver device, wherein the passive antenna device comprises an optoelectronic/electrical to optical conversion module, a digital analog/analog to digital converter, and a band pass filter, a power amplifier, a gain amplifier, a low noise amplifier, a circulator, a delayer and a passive antenna; the active phased array antenna device comprises a RF processing module, a high stability signal source, a quadrature phase detector, a receiver, a transmitter and an active phased antenna; and a data source part comprising an electronic tag, an active electronic tag, a wireless controller, or, a device, an item, or a product identified by an electronic tag, or an electronic tag wore by a person.

2. The distributed IoT terminal system based on a fiber optic bus RoF according to claim 1, wherein the preposed total control module is responsible for controlling the RF signal processing module to perform RF signal processing and perform RF protocol message format combination, and perform protocol interaction with the bus control module and perform bus control protocol message format combination, and perform network interaction with NB-IoT, LoRa, RPMA, WiFi, BLE, RF, 2G/3G/4G/5G, network connection module, and is responsible for transceiving and interacting with optical RF or optical fiber sensor or optical environment parameter detection sensor, video communication fiber, or exchanges information on the high speed bus through a transceiver in the bus control module, or exchanges information on the fiber optic bus through an optoelectronic modulator, a demodulator, a transceiver in the bus controlling module.

3. A method for deploying an acquisition terminal based on the distributed IoT terminal system based on a fiber optic bus RoF according to claim 1, comprising the steps of:
the RF signal is directly modulated onto the optical signal and transmitted to the antenna of the acquisition terminal through an optical fiber network; the antenna collects data source signal and modulates collected RF signal onto the optical fiber that transmitted to a pre-processor through the optical fiber network; the preposed total control module performs RF signal processing and interaction through the RF signal processing module.

4. A method for deploying an acquisition terminal based on the distributed IoT terminal system based on a fiber optic bus RoF according to claim 1, comprising the steps of:
the RF signal is converted digitally, perform bus protocol combination conversion through the bus control module, an information exchanged on the high-speed bus through the transceiver in the bus control module is transmitted to an acquisition field bus control module through the high-speed bus, or a bus protocol frame data modulated onto the fiber optic bus is transmitted to the acquisition field bus control module through the optical fiber; the bus control module sends the RF signal to an acquisition terminal antenna performing data source signal collecting, and the collected RF signal is sent to the bus control module for the bus protocol conversion, a transceiver in the bus control module exchanges information on the high-speed bus and transmits it to a pre-processor bus control module through the high-speed bus, or the bus control module modulates the bus protocol frame data onto the optical fiber and transmits it to the pre-processor through an optical fiber network, the preposed total control module performs bus data reception processing through controlling the bus control module, and an RF protocol is transmitted to the RF signal processing module for RF signal processing.

5. A method for deploying an acquisition terminal based on the distributed IoT terminal system based on a fiber optic bus RoF according to claim 1, wherein the method for deploying the acquisition terminal is a deploying method for RF fiber phased array RFID system, comprising the following steps:
the RF signal is processed through the preposed total control module controlling the RF signal processing module, and a bus protocol combination is converted through the bus control module, and an information is exchanged on the high speed bus through a transceiver in the bus control module and transmitted to an acquisition field bus control module through the high speed bus, or the bus control module modulates the bus protocol frame data onto the fiber optic bus and transmits the data to the acquisition field bus control module through the optical fiber, and the bus control module sends signal to a phased array antenna of the acquisition terminal, and the phased array antenna collects data source signal which is sent to the bus control module for bus protocol conversion, the information is exchanged on the high speed bus through the transceiver in the bus control module on the high speed bus and transmitted to a pre-processor bus control module through the high speed bus, or the bus control module modulates the bus protocol frame data onto the optical fiber and transmitted it to the pre-processor through an optical fiber network, the preposed total control module performs bus data reception processing through controlling the bus control module, and an RF protocol is transmitted to the RF signal processing module for RF signal processing.

6. A method for deploying an acquisition terminal based on the distributed IoT terminal system based on a fiber optic bus RoF according to claim 1, wherein the method for deploying the acquisition terminal is a RF fiber ROF active phased array RFID system the method includes the following steps:
phased-array antenna signal acquisition processing is performed instant, in real time and interacts with a pre-processor through an acquisition terminal field preposed high-stability signal source, the preposed total control module controls the bus control module to send a control command which performs bus protocol combination conversion through the bus control module, and an information is exchanged on the high-speed bus through the transceiver in the bus control module and transmitted to an acquisition field bus control module through the high-speed bus, or the bus protocol frame data is modulated onto the fiber optic bus and transmitted to the acquisition field bus control module through the optical fiber, and the bus control module sends a signal to the RF control processing module of the acquisition terminal, the RF control processing module controls the high stability signal source to generate a high stable signal and transmits the data to a phased array antenna through the transmitter, and the phased array antenna collects the source signal which is sent to the receiver sends the signal to the quadrature phase detector; after the quadrature phase detector processes the data, the data is processed by an RF control processing module and sent to the bus control module performs the bus protocol conversion; the transceiver in the bus control module exchanges information on the high-speed bus and transmits it to a pre-processor bus control module through the high-speed bus, or the bus control module modulates the bus protocol frame data onto the optical fiber and transmitted it to the pre-processor through an optical fiber network, the preposed total control module performs bus data reception processing through controlling the bus control module.

7. A method for deploying an acquisition terminal based on the distributed IoT terminal system based on a fiber optic bus RoF according to claim 1, wherein the method for deploying the acquisition terminal is a method of a fiber-optic sensor or a sensor communication fiber-optic system, including the following steps:

the preposed total control module controls the RF signal processing module to process a sensing signal of an optical fiber sensor of the acquisition terminal or a sensing signal of the optical environment parameter detecting sensor, an optical communication optical fiber signal, or the preposed total control module controls the bus control module to send a control command which performs a bus protocol combination conversion of signals through the bus control module, an information is exchanged on the high-speed bus through the transceiver in the bus control module transmitted to the acquisition field bus control module through the high-speed bus, or modulated the bus protocol frame data onto the optical fiber bus and transmitted to the acquisition field bus control module through the optical fiber, the bus control module sends the signal to the acquisition terminal sends a collected environmental parameter sensor signal and a video communication signal to the bus control module, and the bus control module performs a bus protocol conversion and exchanges information on the high-speed bus through the transceiver in the bus control module, and transmits it to the pre-processor bus control module through the high-speed bus, or the bus control module modulates the bus protocol frame data onto the optical fiber and transmitted it to a pre-processor through an optical fiber network, the preposed total control module performs bus data reception processing through controlling the bus control module.

* * * * *